United States Patent [19]

Williams, Jr. et al.

[11] 4,105,118

[45] Aug. 8, 1978

[54] LAMINATES USEFUL AS PACKAGING MATERIALS AND CONTAINER HAVING ALKALINE FLUID MEANS

[75] Inventors: Robert Franklin Williams, Jr., Webster; Chen-i Lu, Rochester, both of N.Y.

[73] Assignee: Eastman Kodak Company, Rochester, N.Y.

[21] Appl. No.: 694,758

[22] Filed: Jun. 10, 1976

[51] Int. Cl.$^2$ .................. B32B 27/38; B65D 85/84
[52] U.S. Cl. .................. 206/524.2; 428/414; 428/418; 428/420; 428/463; 428/464; 428/220; 428/516; 428/518; 428/520; 156/272; 260/23 EP; 260/22 TN; 229/3.5 MF; 206/524.5
[58] Field of Search .............. 428/418, 414, 420, 220, 428/518, 463, 520, 516, 464; 156/272; 260/23 EP, 22 TN; 206/524.1, 524.2, 524.5; 229/3.5 MF

[56] References Cited

U.S. PATENT DOCUMENTS

| | | | |
|---|---|---|---|
| 3,056,492 | 10/1962 | Campbell | 229/3.5 MF |
| 3,188,265 | 6/1965 | Charbonneau | 428/420 |
| 3,188,266 | 6/1965 | Charbonneau | 428/420 X |
| 3,661,576 | 5/1972 | Crary | 96/35.1 |
| 3,669,825 | 6/1972 | Hall | 428/420 |
| 3,772,062 | 11/1973 | Shur et al. | 260/837 R |
| 3,906,126 | 9/1975 | Kaiser et al. | 428/420 X |

OTHER PUBLICATIONS

Marans et al., J. Applied Polym. Sci., 1965, vol. 9, pp. 3661–3680.

*Primary Examiner*—P. C. Ives
*Attorney, Agent, or Firm*—A. P. Lorenzo

[57] ABSTRACT

Heat-sealable laminates useful as packaging materials, for example, for the packaging of photographic processing chemicals, are comprised of a metal foil, a thermoplastic polymeric film, and an interlayer formed by radiation curing of a composition comprising an acrylated epoxy resin. The laminates are manufactured by a process which comprises forming a sandwich comprising a layer of metal foil, a layer of thermoplastic polymer and an interlayer formed from a composition comprising an acrylated epoxy resin and irradiating the interlayer through the layer of thermoplastic polymer, for example by the use of ultraviolet radiation or high energy ionizing radiation, to cure the interlayer and bond it to both the layer of metal foil and the layer of thermoplastic polymer.

18 Claims, No Drawings

LAMINATES USEFUL AS PACKAGING MATERIALS AND CONTAINER HAVING ALKALINE FLUID MEANS

This invention relates to novel laminated materials comprising a layer of a metal foil and a layer of a thermoplastic polymer. More specifically, this invention relates to heat-sealable laminates that are especially useful as packaging materials, for example for the packaging of photographic processing chemicals, which comprise a radiation-cured polymeric interlayer which bonds a layer of metal foil to a layer of thermoplastic polymer.

Laminates which comprise a layer of metal foil bonded to a layer of thermoplastic polymer are well known materials. As described by Marans and Addy in an article entitled "Film Lamination by Radiation-Induced Polymerization of Acrylic Acid," Journal of Applied Polymer Science, Vol. 9, pages 3661–3680, 1965, they can be prepared by using techniques such as heat plus pressure, adhesives, electric discharges, flaming, and further polymerization or crosslinking of prepolymers. The specific procedure described in detail by Marans and Addy involves the use of radiation-induced explosive polymerization of acrylic acid to form a discrete poly(acrylic acid) layer which serves as an interlayer between two films, such as a metal foil and a thermoplastic polymer film.

Prior methods of forming laminates of metal foils and thermoplastic films suffer from serious disadvantages which significantly restrict the usefulness of the resulting materials. For example, it is a common problem for the material to undergo delamination in use, especially when subjected to conditions of high temperature and high humidity Moreover, even if delamination does not occur, the laminate may be adversely affected by the heat used in heat-sealing operations, or it may be lacking in ability to act as an effective barrier to oxygen and thereby be unable to adequately protect chemicals packaged therein from unwanted oxidation, or it may be subject to attack by common chemicals such as alkaline agents. Materials used in bonding the metal foil to the thermoplastic film may be effective as bonding agents but the bonding layer formed therefrom may be incapable of protecting the metal foil from attack by chemicals. Packaging materials used with sensitive chemicals, for example, many of the chemicals used in photographic processing, must possess a combination of characteristics such as strength, imperviousness to oxygen and moisture, and resistance to chemical attack, and laminates previously known have been lacking in one or more of these characteristics or have been incapable of being heat-sealed by common heat-sealing methods and, accordingly, have not found widespread use for this purpose.

In accordance with this invention, novel heat-sealable laminates are provided which effectively overcome the disadvantages associated with heat-sealable laminates of the prior art. The novel laminates of the invention are strongly bonded so as to resist delamination under stringent conditions of use, provide an effective barrier to oxygen and moisture, are easily heat-sealed to form packages, and are resistant to attack by common chemicals, such as alkaline agents. Laminates having this highly desirable combination of properties are comprised of a metal foil, a thermoplastic polymeric film, and a radiation-cured interlayer which has been bonded to both the foil and the film by irradiation and which has been formed by irradiation of a composition comprising an acrylated epoxy resin. These laminates are manufactured by a process which comprises forming a sandwich comprising a layer of metal foil, a layer of thermoplastic polymer and an interlayer formed from a composition comprising an acrylated epoxy resin and irradiating the interlayer through the layer of thermoplastic polymer to cure the interlayer, i.e., polymerize and/or crosslink it, and bond it to both the layer of metal foil and the layer of thermoplastic polymer. Irradiation is carried out by any suitable method that is capable of curing the interlayer, for example by exposure to ultraviolet radiation or to high energy ionizing radiation.

The metal foil utilized in forming the laminates of the invention can be any metal foil which exhibits impermeability toward water vapor and oxygen such that it forms a protective barrier against the penetration of these agents through the laminate so as to prevent exposure of the material in the package thereto. Foils formed from lead, aluminum, copper, steel of other metals can be utilized, with lead or aluminum foil being preferred. For reasons of economy, it is advantageous to use foil which is as thin as possible without loss of necessary strength. Typically, the foil that is used will have a thickness in the range from about 0.8 to about 2 mils and preferably in the range from about 1 to 1.5 mils. The strength of the metal foil utilized in this invention can be improved by adhesively laminating thin foil with paper, such lamination having no adverse effects with respect to the barrier properties of the foil. When a foil-paper laminate is utilized, the metal surface of the laminate is the surface which is in contact with the radiation-cured interlayer. Any type of paper can be used as the substrate in the paper-foil laminate, for example, cellulosic paper or synthetic papers such as those made from polystyrene or polyolefins, including non-woven and spun-bonded polyolefins. Kraft paper is preferred. The overall thickness of the paper-foil laminate is typically in the range from about 2 to about 7 mils, with a preferred thickness of 3 mils.

The thermoplastic polymer utilized in forming the heat-sealable film that is incorporated into the laminate of this invention can be any polymer which is capable of forming a thin, flexible, heat-sealable film. In use in the laminate, the film is in contact on one side with the ingredients contained in the package and on the opposite side with the radiation-cured interlayer. The film should be permeable to the radiation used in forming the laminate and resistant to attack by the chemicals which are to be packaged. Particularly useful thermoplastic polymers include polypropylene, polyethylene of low, medium or high density, copolymers of ethylene such as an ethylene/vinyl acetate copolymer, polyvinyl chloride, copolymers of vinyl chloride such as vinyl chloride/propylene copolymer or vinyl chloride/vinyl acetate copolymer, and the like. Other thermoplastics that can be used include polystyrene, nylon, polycarbonates, polyesters, and acrylonitrilebutadiene-styrene resins, but these materials should not be employed when the laminate is intended for use with strong alkalies. Preferred thermoplastic polymers are polyethylene, polypropylene, polyvinyl chloride, vinyl chloride/propylene copolymer and vinyl chloride/vinyl acetate copolymer. The thickness of the thermoplastic polymeric film is typically in the range from about 0.5 to about 6 mils, with a preferred thickness being from about 0.8 to about 1.5 mils.

The thermoplastic film can be composed of a single polymer or it can be a composite film made up of two or more layers of different thermoplastic polymers prepared by coating, co-extrusion, lamination, or other means.

The radiation-curable composition used in forming the interlayer in the laminates of this invention is a composition comprising an acrylated epoxy resin. The acrylated epoxy resins are well known materials and resins of this type have been described in numerous patents, for example, in U.S. Pat. Nos. 3661576, 3673140, 3713864, and 3772062 and in British Pat. No. 1375177. Typical resins of this type are those derived from bisphenols. In a preferred embodiment of this invention, the acrylated epoxy resin is a reaction product of epichlorohydrin, bisphenol-A and an acrylic monomer, such reaction product being represented by the formula:

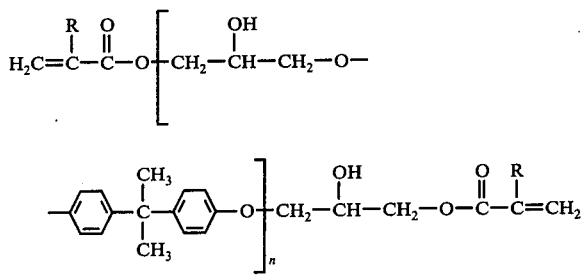

wherein R is a hydrogen atom or a methyl group and $n$ is 1 to 20. These reaction products are relatively viscous liquids when $n$ is low, e.g., 1 to 3, which become increasingly viscous as the value of $n$ increases and are solids when $n$ is high, e.g., 10 to 20.

When the acrylated epoxy resin is a liquid of a viscosity suitable for coating it can be used as the radiation-curable composition which forms the interlayer without the addition thereto of any solvents or diluents. When the acrylated epoxy resin is a solid it can be dissolved in a monofunctional acrylic monomer to form a composition suitable for coating. Such monomers can, of course, also be used to dilute the resin and render it less viscous when it is a liquid of too great a viscosity to be easily coated. Typical examples of monofunctional acrylic monomers useful for these purposes are acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. The use of 2-hydroxypropyl acrylate, or other hydroxylated monomers, should be avoided when it is desired that the laminate be highly resistant to alkaline liquids. Polyfunctional acrylates and methacrylates, i.e., those containing at least two acrylic ester groups, can also be advantageously included in the radiation-curable composition to modify such characteristics as curing rate and brittleness of the cured interlayer. Typical examples of suitable polyfunctional acrylates and methacrylates are neopentylglycol diacrylate, trimethylol propane triacrylate, 1,6-hexanediol diacrylate, 1,3-propanediol dimethacrylate, 1,3-butylene glycol dimethacrylate, and the like. The radiation-curable composition can also contain other ethylenically unsaturated monomers such as styrene, ethyl vinyl benzene, α-methyl styrene, vinyl acetate, and the like. Mixtures of two or more monofunctional acrylates, of two or more polyfunctional acrylates, and of two or more other ethylenically unsaturated monomers can also be used as desired. A preferred composition consists of an acrylated epoxy resin of the above formula, in which $n$ is in the range of 10 to 15, dissolved in a mixture of 85 to 95 percent by weight butyl acrylate and 5 to 15 percent by weight neopentylglycol diacrylate.

In addition to the acrylated epoxy resin, the radiation-curable composition can also contain other resins which serve to modify its properties in a desirable manner, for example, it can contain resins which act to improve its adhesive characteristics. The use of such other resins is optional and dependent upon the intended use of the laminate.

The radiation-cured interlayer which forms an essential part of the laminates of this invention will typically have a thickness in the range from about 0.2 to about 2 mils, and preferably of about 0.4 to about 1.0 mil. It is bonded on one side to the metal foil and on the opposite side to the thermoplastic polymer film, such bonding having been brought about as a result of the radiation curing. It is resistant to chemical attack and not adversely affected by the heat used in heat-sealing the laminate.

As previously described herein, the novel laminates of this invention are manufactured by a process which comprises forming a sandwich comprising a layer of the metal foil, a layer of the thermoplastic polymer and an interlayer formed from the radiation-curable composition and irradiating the interlayer through the layer of thermoplastic polymer to cure the interlayer and bond it to both the layer of metal foil and the layer of thermoplastic polymer. The sandwich can be produced by using pre-formed metal foils and thermoplastic films, coating the radiation-curable composition on either the surface of the foil or the surface of the film, and then pressing the coated surface against the uncoated surface. Alternatively, the radiation-curable composition can be coated on the surface of the metal foil, a molten thermoplastic polymer can be extruded from a suitable extruder onto the coated foil, and the sandwich can be pressed together by suitable means such as pressure rolls. The temperature used for extrusion would depend upon the particular thermoplastic employed, for example, a temperature of about 400° to 550° F for polypropylene, about 300° to about 415° F for polyvinyl chloride, and about 330° to about 375° F for vinyl chloride/propylene copolymer.

Coating of the metal foil or thermoplastic film with the radiation-curable composition can be carried out in any convenient manner. For example, it can be carried out by dip coating, air knife coating, roll coating, gravure coating, extrusion coating, bead coating, curtain coating, use of wire wound coating rods, and so forth. The viscosity of the composition can be widely varied depending on the particular method of coating which is chosen.

Apparatus and methods for curing of radiation-curable compositions by subjecting them to suitable forms of radiation are well known and any suitable radiation curing process can be used in carrying out this invention. For example, curing can be carried out by the application of ultraviolet radiation of suitable intensity. High energy ionizing radiation such as X-rays, gamma rays, beta rays and accelerated electrons can also be used to accomplish curing of the coating. The radiation used should be of a sufficient intensity to penetrate through the thermoplastic polymer film and all the way through the coated interlayer. The total dosage employed should be sufficient to bring about curing of the radiation-curable composition to form a solid plastic. Typically, dosages in the range of from about 0.2 to about 50 megarads, more usually in the range from about 0.5 to about 20 megarads, are employed. The coating compositions used in this invention are substantially completely convertible to a solid product so that the removal of solvents or diluents during the curing step is not necessary.

When the radiation-curable composition is cured by the use of ultraviolet radiation, a photoinitiator should preferably be included in the composition. Many photoinitiators which are useful for such purpose are known to the art, for example, butyl benzoin ether, isobutyl benzoin ether, benzophenone, benzoin, acetophenone dimethyl quinoxiline, methyl diethanol amine, 4,4'-bis(-dimethylamino)benzophenone, 4,4'-bis(ethoxycarbonyl)benzoin ethyl ether, 4,4'-bis(chloromethyl)benzophenone, and the like. Such photoinitiators may be used singly or in combination. The use of photoinitiators is not necessary when curing is carried out with high energy electrons.

Curing conditions should be selected so as to cause minimal degradation of the thermoplastic film and the interlayer. For ultraviolet light curing, good results are typically obtained by advancing the sandwich at a speed in the range of 15 to 45 feet per minute under a bank of three high-intensity mercury vapor lamps having a watt density of 200 watts/inch and a spectral range of 240 to 1367 nanometers. When the combined thickness of the thermoplastic film and interlayer does not exceed about 2-mils, electron curing can be satisfactorily carried out by advancing the sandwich at a rate of 75 to 100 feet per minute through a 10 mA, 150 KV accelerator. When the thickness is greater than this, an electron accelerator of higher energy should be employed.

Polymerization and/or cross-linking of the interlayer composition caused by the irradiation results in strong bonding to both the thermoplastic film and the metal foil while forming a discrete layer of irradiation product of the radiation-curable composition. Monomers present in the radiation-curable composition also take part in the polymerization and/or cross-linking reactions.

The novel laminated materials of this invention are advantageously employed in the packaging of liquid chemicals. They are particularly useful in the packaging of aqueous alkaline compositions such as are commonly used in photographic processing, for example, alkaline photographic developing solutions, in view of their excellent resistance to attack by alkaline agents and impermeability to oxygen from which such solutions must be protected. Thus, a preferred embodiment of the invention is an article of manufacture comprising a container and alkaline fluid means disposed in the container, the aforesaid container being at least partially constructed from a laminate having at least first, second and third layers, the first layer being a thermoplastic polymeric film in contact with the alkaline fluid means, the second layer being a barrier layer disposed between the first and third layers, and the third layer being a metal foil. The barrier layer is a radiation-cured layer formed by curing a radiation-curable composition containing an acrylated epoxy resin in contact with both the aforesaid first and third layers.

The invention is further illustrated by the following examples of its practice.

EXAMPLE 1

A radiation-curable composition was prepared by dissolving 60 grams of an acrylated epoxy resin in 40 grams of butyl acrylate and adding to the composition 2.5 grams of 4,4'-bis(ethoxycarbonyl)benzoin ethyl ether as a photoinitiator. The acrylated epoxy resin was a condensation product of epichlorohydrin and bisphenol-A (molar ratio of 1.6:1) reacted with methacrylic acid to form ester end groups and is represented by the formula:

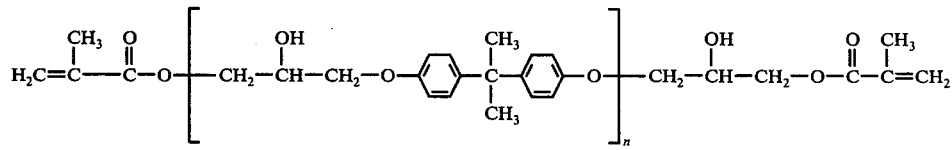

wherein $n$ has a value of about 13.

The radiation-curable composition was coated as a layer with a thickness of 1 mil on the lead surface of an adhesively bonded laminate of paper and lead foil composed of paper with a thickness of 1.9 mils and lead foil with a thickness of 1.5 mils. A 5 mil thick thermoplastic film of a copolymer of propylene and vinyl chloride was immediately pressure rolled onto the coated surface. The resulting sandwich was then irradiated with UV light from a General Electric UV arc UA-11 lamp for 5 minutes with the thermoplastic film surface of the sandwich towards the bulb and 3¾ inches from the bulb surface. Following this irradiation, the layers of the laminate were strongly bonded so that they could not be separated.

A pouch was made from the above-described laminate by folding and heat-sealing two sides. The pouch was filled with an alkaline photographic developer solution and then the third side was heat-sealed to form a fully enclosed container. The sealed container of photographic developer solution was then incubated for three days at a temperature of 63° C and a relative humidity of 10 percent. After incubation, the container was opened at the heat-seal region and the developer solution removed. The laminate in the separated heat-seal area was examined for delamination and no evidence of delamination was detected. There was also no evidence of delamination in any other area of the pouch and no indication of chemical attack on the lead.

EXAMPLE 2

Example 1 was repeated except that the propylenevinyl chloride film was replaced by a co-extruded composite film consisting of a layer of high density polyethylene with a thickness of 2.8 mils and a layer of ethylene-vinyl acetate copolymer with a thickness of 1 mil. The ethylene-vinyl acetate surface of the co-extruded composite film was pressed against the coated surface of the lead foil and the sandwich was irradiated in the same manner as in Example 1. Pouches formed from the resulting laminate were tested for delamination in the same manner as described in Example 1 and no evidence of delamination or chemical attack was detected. One of these pouches was filled with an alkaline photographic developer solution, heat-sealed and incubated for one week at a temperature of 63° C and a relative humidity of 10 percent. The weight of the pouch filled with developer solution was exactly 14.3800 grams both before and after incubation, thereby indicating that the laminate provided an excellent moisture barrier.

EXAMPLE 3

Example 1 was repeated except that the propylenevinyl chloride film was replaced by a 5 mil thick extruded low density polyethylene film that had been subjected to corona discharge treatment on one side thereof. The corona discharge treated surface of the polyethylene film was pressed against the coated surface of the lead foil and the sandwich was irradiated in the same manner as in Example 1. Pouches formed from the resulting laminate were tested for delamination in the same manner as described in Example 1 and no evidence of delamination or chemical attack was detached. One of these pouches was filled with an alkaline photographic developer solution, heat-sealed and incubated for one week at a temperature of 63° C and a relative humidity of 10 percent. The weight of the pouch filled with developer solution was 14.8947 grams before incubation and 14.8922 grams after incubation, thereby indicating that the laminate provided a good moisture barrier.

EXAMPLE 4

Example 1 was repeated except that the propylenevinyl chloride film was replaced by a fluid compression rolled, co-extruded composite film consisting of a layer of low density polyethylene with a thickness of 0.2 mils on both sides of a core of high density polyethylene having a thickness of 0.6 mils. The method for preparing the fluid compression rolled film is described in U.S. Pat. No. 3,504,075. The photoinitiator used in Example 1 was replaced by the same amount of butyl benzoin ether. One side of the low density polyethylene surface of the film was subjected to corona discharge treatment. The corona discharge treated surface of the film was pressed against the coated surface of the lead foil. The sandwich was irradiated with three, two hundred watts per linear inch, Hanovia, medium pressure, mercury type UV lamps for a period of 9 seconds. Pouches formed from the resulting laminate were tested for delamination in the same manner as described in Example 1 and no evidence of delamination or chemical attack was detected.

EXAMPLE 5

Example 4 was repeated except that the fluid compression rolled, co-extruded composite film was replaced by a 1 mil thick high density polyethylene film and the paperfoil laminate was composed of paper with a thickness of 1 mil and lead foil with a thickness of 1 mil. Pouches formed from the resulting laminate were tested for delamination in the same manner as described in Example 1 and no evidence of delamination or chemical attack was detected.

EXAMPLE 6

A radiation-curable composition was prepared from the following materials:

70 grams of the acrylated epoxy resin described in Example 1
26.5 grams butyl acrylate
3.5 grams neopentylglycol diacrylate
1 gram butyl benzoin ether
1 gram 4,4'-bis(chloromethyl)benzophenone The radiation-curable composition was coated on the lead surface of an adhesively bonded laminate of paper and lead foil composed of paper with a thickness of 1 mil and lead foil with a thickness of 1 mil. The coated surface was then brought into contact with a 1-mil thick vinyl chloride/vinyl acetate copolymer film in the nip of pinch rolls held with 50 psi pressure and, as a result of the pressure, the coating composition was spread to a thickness of 0.2 mil. The resulting sandwich was then irradiated to cure the coating composition by passing it at a speed of 35 feet per minute through an oven containing a 200 watts per linear inch, Hanovia, medium pressure, mercury type UV lamp, with the vinyl chloride/vinyl acetate copolymer side of the sandwich facing the UV source. Pouches formed from the resulting laminate were tested in the same manner as described in Example 1 and no evidence of delamination or chemical attack was detected.

EXAMPLE 7

A radiation-curable composition was prepared from the following materials:

36 grams of the acrylated epoxy resin described in Example 1,
12.5 grams of an acrylic resin sold by Monsanto Company under the trademark GELVA Multipolymer Hot Melt RA-1349,
16.7 grams of a terpene-phenol resin sold by Hercules, Inc. under the trademark PICCO LTP 100,
34.8 grams butyl acrylate
4 grams neopentylglycol diacrylate
1.5 grams butyl benzoin ether
1.0 grams 4,4'-bis(chloromethyl)benzophenone.

The radiation-curable composition was coated on the lead surface of an adhesively bonded laminate of paper and lead foil composed of paper with a thickness of 1 mil and lead foil with a thickness of 1 mil. A 1 mil thick polypropylene film that had been subjected to corona discharge treatment on one side was pressed against the coated surface, with the corona discharge treated surface in contact with the coating composition, between pinch rolls held with 50 psi pressure. The pressure between the pinch rolls spread the coating composition to a thickness of 0.5 mils. The resulting sandwich was then irradiated to cure the coating composition by passing it at a speed of 25 feet per minute through an oven containing a 200 watts per linear inch, Hanovia, medium pressure, mercury type UV lamp, with the polypropylene side of the sandwich facing the UV source. Pouches formed from the resulting laminate were tested in the same manner as described in Example 1 and no evidence of delamination or chemical attack was detected.

In the article by Marans and Addy referred to hereinabove, laminates comprising a layer of metal foil bonded to a layer of thermoplastic polymer are prepared by radiation-induced explosive polymerization of acrylic acid to form a discrete poly(acrylic acid) layer. Mixtures of acrylic acid and 2-ethylhexyl methacrylate are also disclosed as being useful for this purpose. In order to compare such laminates with those of the present invention, tests were carried out in which the paper-lead foil material described in Example 1 above was coated with acrylic acid, sandwiched together with a thermoplastic film, and exposed to an electron beam in an electron accelerator to polymerize the acrylic acid. Ten drops of the acrylic acid were placed on the lead side of 6-inch by 6-inch sections of the paper-lead foil material and spread to form a uniform coating. Four different thermoplastic polymer films were used to prepare four different laminates. The thermoplastic films that were used were a low density polyethylene film with a thickness of 1 mil, a high density polyethylene film with a thickness of 1 mil, a polypropylene film with a thickness of 0.9 mil. and a polyvinyl chloride film with a thickness of 1 mil. In each case, curing was carried out by use of a 10 mA, 150 KV electron accelerator with a total radiation dosage of 5 megarads. The exposure of the sandwich was carried out in air through the layer of thermoplastic polymer. Only the polypropylene provided an acceptable bond as the other laminates could be easily peeled apart. Three pouches were prepared, using a rotary heat-sealer set at 400° F, from the polypropylene laminate. Each pouch was filled with a 5% aqueous sodium hydroxide solution, then weighed and incubated 15 days at ambient conditions. The weight changes were measured and the pouches were opened to observe the interior. Results of the weight measurements showed an average weight loss of 9.1 percent. Upon opening each pouch it was observed that the polypropylene had separated from the lead foil, thereby indicating that the interlayer had been attacked by the alkaline solution. An attempt to prepare laminates from the same thermoplastics by replacing the acrylic acid with a mixture of 80% by weight 2-ethylhexyl methacrylate and 20% by weight acrylic acid was unsuccessful as the interlayer did not cure when it was exposed to the electron beam.

Laminates prepared in accordance with this invention have many advantageous characteristics when used as packaging materials. In particular they are lightweight, strong and flexible, highly resistant to delamination, effective as barriers against moisture and oxygen, and highly resistant to attack by chemicals which prior art laminates are frequently incapable of withstanding. The radiation curing results in bonding of the thermoplastic film and interlayer material into a composite polymeric structure which effectively protects the metal foil and is securely joined therewith. The combined properties of the thermoplastic film and cured interlayer are exceptionally effective in protecting the metal foil layer. The effective barrier properties and resistance to chemical attack are achieved while still retaining excellent heat-sealing properties which render the use of simple and inexpensive heat-sealing equipment practical. Manufacture of the laminate in accordance with the process described herein requires no drying step and avoids the discharge of volatile solvents into the environment. The manufacturing process is readily adapted to use with laminates of paper and metal foil which provides the advantage of extra strength and also a packaging material that has an exterior surface of paper which is, accordingly, well suited for printing of directions or advertising material on the package itself.

The invention has been described in detail with particular reference to preferred embodiments thereof, but it will be understood that variations and modifications can be effected within the spirit and scope of the invention.

We claim:

1. An article of manufacture comprising a container and alkaline fluid means disposed in said container, said container being at least partially constructed from a heat-sealable laminate having at least first, second and third layers, said first layer being a thermoplastic polymeric film in contact with said alkaline fluid means, said second layer being a barrier layer disposed between said first and third layers, and said third layer being a metal foil; said barrier layer being a radiation-cured layer formed by curing a radiation-curable composition in contact with both said first and third layers, said radiation-curable composition comprising an acrylic monomer and an acrylated epoxy resin of the formula:

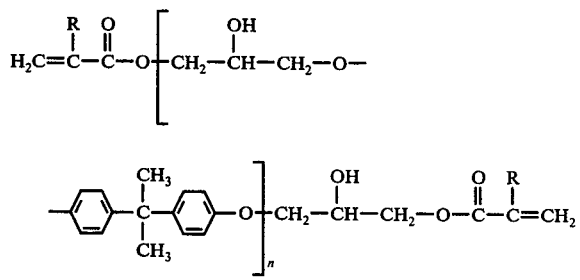

wherein R is a hydrogen atom or a methyl group and n is 1 to 20.

2. An article of manufacture as claimed in claim 1 wherein said radiation-curable composition comprises said acrylated epoxy resin, a monofunctional acrylic monomer and a member selected from the group consisting of polyfunctional acrylates and polyfunctional methacrylates.

3. An article of manufacture as claimed in claim 1 wherein said thermoplastic polymeric film is a film formed from a copolymer of vinyl acetate and vinyl chloride.

4. An article of manufacture as claimed in claim 1 wherein said thermoplastic polymeric film is a polypropylene film, said metal foil is lead foil, and said radiation-curable composition is comprised of butyl acrylate, neopentylglycol diacrylate, and an acrylated epoxy resin of the formula:

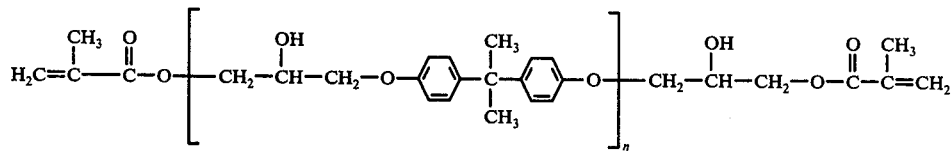

wherein n has a value of about 13.

5. A heat-sealable laminate adapted for use as a packaging material, said laminate comprising (1) a metal foil, (2) a thermoplastic polymeric film, and (3) a radiation-cured interlayer which has been bonded to both said foil and said film by irradiation, said interlayer having been formed by irradiation of a radiation-curable composition comprising an acrylic monomer and an acrylated epoxy resin of the formula:

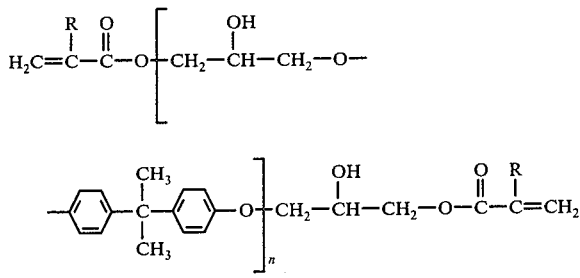

wherein R is a hydrogen atom or a methyl group and $n$ is 1 to 20.

6. A heat-sealable laminate as claimed in claim 5 wherein said foil is lead foil.

7. A heat-sealable laminate as claimed in claim 5 wherein said foil is aluminum foil.

8. A heat-sealable laminate as claimed in claim 5 additionally comprising a layer of paper laminated to said metal foil.

9. A heat-sealable laminate as claimed in claim 5 wherein said thermoplastic polymeric film is a polyethylene film.

10. A heat-sealable laminate as claimed in claim 5 wherein said thermoplastic polymeric film is a polypropylene film.

11. A heat-sealable laminate as claimed in claim 5 wherein said thermoplastic polymeric film is a polyvinyl chloride film.

12. A heat-sealable laminate as claimed in claim 5 wherein said thermoplastic polymeric film is a co-extruded composite film formed from at least two different thermoplastic polymers.

13. A heat-sealable laminate as claimed in claim 5 wherein said thermoplastic polymeric film is a film formed from a copolymer of propylene and vinyl chloride.

14. A heat-sealable laminate as claimed in claim 5 wherein said thermoplastic polymeric film is a film formed from a copolymer of vinyl acetate and vinyl chloride.

15. A heat-sealable laminate as claimed in claim 5 wherein said radiation-curable composition comprises said acrylated epoxy resin, a monofunctional acrylic monomer, and a member selected from the group consisting of polyfunctional acrylates and polyfunctional methacrylates.

16. A heat-sealable laminate as claimed in claim 5 wherein said radiation-curable composition comprises butyl acrylate, neopentylglycol diacrylate and an acrylated epoxy resin of the formula:

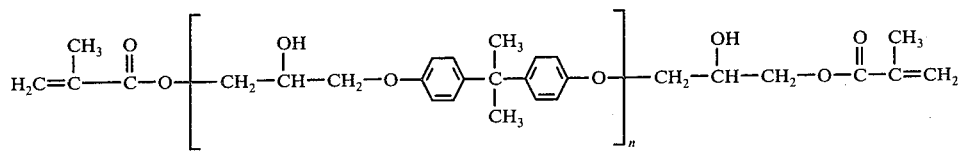

wherein $n$ has a value of about 13.

17. A heat-sealable laminate as claimed in claim 5 wherein said metal foil has a thickness in the range from about 0.8 to about 2 mils, said thermoplastic polymeric film has a thickness in the range from about 0.5 to about 6 mils, and said interlayer has a thickness in the range from about 0.2 to about 2 mils.

18. A heat-sealable laminate as claimed in claim 5 wherein said metal foil has a thickness in the range from about 1 to about 1.5 mils, said thermoplastic polymeric film has a thickness in the range from about 0.8 to about 1.5 mils, and said interlayer has a thickness in the range from about 0.4 to about 1.0 mils.